(12) United States Patent
Siegel et al.

(10) Patent No.: US 7,739,335 B2
(45) Date of Patent: Jun. 15, 2010

(54) METHOD AND APPARATUS FOR PROVIDING A CUSTOMIZED SELECTION OF AUDIO CONTENT OVER THE INTERNET

(75) Inventors: Brian M. Siegel, Washingtonville, NY (US); Philip M. Abram, Warwick, NY (US); Marc Beckwitt, San Clemente, CA (US); Gregory D. Gudorf, San Diego, CA (US); Kazuaki Iso, Oradell, NJ (US); Brian Raymond, San Diego, CA (US); Christopher M. Tobin, Central Valley, NY (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 2318 days.

(21) Appl. No.: 09/795,685

(22) Filed: Feb. 28, 2001

(65) Prior Publication Data

US 2002/0002483 A1 Jan. 3, 2002

Related U.S. Application Data

(60) Provisional application No. 60/213,122, filed on Jun. 22, 2000.

(51) Int. Cl.
G06F 15/173 (2006.01)
(52) U.S. Cl. .................................................. 709/206
(58) Field of Classification Search ................ 709/206, 709/203, 217, 223
See application file for complete search history.

(56) References Cited

U.S. PATENT DOCUMENTS

| | | | |
|---|---|---|---|
| 5,822,537 A * | 10/1998 | Katseff et al. ............... 709/231 |
| 5,848,396 A | 12/1998 | Gerace ........................ 705/10 |
| 5,890,152 A | 3/1999 | Rapaport et al. ............... 707/6 |
| 5,953,506 A * | 9/1999 | Kalra et al. .................. 709/231 |
| 5,956,716 A | 9/1999 | Kenner et al. ................. 707/10 |
| 5,963,916 A | 10/1999 | Kaplan ........................ 705/26 |
| 5,978,799 A | 11/1999 | Hirsch ........................... 707/4 |
| 5,991,306 A | 11/1999 | Burns et al. ................. 370/429 |
| 6,014,654 A | 1/2000 | Ariyoshi ...................... 706/62 |
| 6,055,542 A | 4/2000 | Nielsen et al. .............. 707/104 |
| 6,055,566 A | 4/2000 | Kikinis ....................... 709/219 |
| 6,070,158 A | 5/2000 | Kirsch et al. .................. 707/3 |
| 6,088,722 A * | 7/2000 | Herz et al. ................... 709/217 |
| 6,122,230 A | 9/2000 | Scibora ....................... 369/32 |
| 6,122,660 A * | 9/2000 | Baransky et al. ............ 709/217 |

(Continued)

Primary Examiner—David Y Eng
(74) Attorney, Agent, or Firm—Mayer & Williams PC; Stuart H. Mayer, Esq.; Karin L. Williams, Esq.

(57) ABSTRACT

A method and apparatus is provided for providing selected media files, which are chosen from among a plurality of media files, to a user over a packet-switched network such as the Internet. The method begins by receiving over the packet-switched network a request from the user to receive media content. Next, a user profile associated with the user is retrieved from a database. The user profile reflects user preferences in media content to be received over the packet-switched network. The plurality of media files are ranked based at least in part on the user profile. At least one highly ranked media file is selected from among the ranked plurality of media files. At least one of the highly ranked media files is forwarded to the user over the packet-switched network.

66 Claims, 5 Drawing Sheets

U.S. PATENT DOCUMENTS

| | | | | |
|---|---|---|---|---|
| 6,208,989 B1 * | 3/2001 | Dockter et al. | ................ | 707/5 |
| 6,317,779 B1 * | 11/2001 | Gile et al. | .................. | 709/217 |
| 6,448,979 B1 * | 9/2002 | Schena et al. | .............. | 345/741 |
| 6,490,627 B1 * | 12/2002 | Kalra et al. | ................ | 709/231 |
| 6,594,699 B1 * | 7/2003 | Sahai et al. | ................ | 709/228 |
| 6,662,231 B1 * | 12/2003 | Drosset et al. | ............. | 709/229 |
| 6,799,201 B1 * | 9/2004 | Lee et al. | ................... | 709/217 |

* cited by examiner

METHOD AND APPARATUS FOR PROVIDING A CUSTOMIZED SELECTION OF AUDIO CONTENT OVER THE INTERNET

CROSS REFERENCE TO RELATED APPLICATION

This application is related to Patent Application Ser. No. 60/213,122, filed Jun. 22, 2000. This application is incorporated herein by reference in its entirety.

FIELD OF THE INVENTION

The present invention relates generally to a method and apparatus for providing content over the Internet, and more particularly to a method and apparatus for providing a selection of audio content over the Internet, which is customized, to the interests of individual users.

BACKGROUND OF THE INVENTION

Broadcasting organizations such as radio and television broadcasters provide an enormous amount of information to the public. Anyone owning a radio or television receiver can tune into a wide variety of programming any time of the day or night. While some broadcasters offer programming designed to appeal to a large cross-section of people, other broadcasters have become more specialized, such as by offering only news, financial, or sports programming. Even broadcasters who program music range from those that appeal to a wide audience and those whose musical programming is limited to a particular category such as classical, jazz, or alternative. In any case, viewers/listeners have a wide variety of information content available to them from various broadcast sources.

In addition to these more traditional sources of information, the Internet now provides a new and expanding source of information for public access. Although quite different from broadcast sources, the Internet also makes a wide variety of information available to the public. Indeed, the information readily available over the Internet typically far exceeds what is available from broadcasters. The manner in which users obtain this information, however, is quite different from how broadcast information is obtained. In particular, the user generally selects broadcast content in a passive mode by scanning the content being received from different broadcasters, while content from the Internet is generally selected in a more active mode by performing content-based searching. That is, in a passive mode of content selection the user is presented with a sequence of programs such as musical selections over which he or she has no control. The user can only control the content by selecting a different content provider. In contrast, in an active mode of content selection, the user has the ability to select each and every program that is to be received.

Recently, radio and even television broadcasters have been making their content available over the Internet. Among the advantages of this arrangement is that the user can receive programming at any time and is not limited to the particular time at which the program is broadcast. Also, the Internet allows local content to be made available worldwide. Moreover, the user can often search for a particular program, program segment, or musical selection, and thus is not limited to selecting content in a passive manner.

With the convergence of traditional broadcasters and other content providers on the Internet, it would be desirable to get the best features of both passive and active methods of selecting content. For instance, broadcasters select programming for the user, which advantageously provides the user with a range of programming at little effort, but which also prevents the user from receiving programming uniquely tailored to his or her interests. In contrast, while Internet content providers generally do not select programming for the user, they make it relatively easy for the user to search for any particular content he or she desires. Moreover, another aspect of the Internet that can facilitate the provision of appropriate content to a given user is the Internet's capability to monitor the online activity of the user.

Accordingly, it would be desirable to provide a method and apparatus for providing programming such as audio content to a user over the Internet, which is selected either directly by the user or in accordance with the user's interests as determined from the observed online behavior of the user.

SUMMARY OF THE INVENTION

The present invention provides a method for providing selected media files, which are chosen from among a plurality of media files, to a user over a packet-switched network such as the Internet. The method begins by receiving over the packet-switched network a request from the user to receive media content. Next, a user profile associated with the user is retrieved from a database. The user profile reflects user preferences in media content to be received over the packet-switched network. The plurality of media files are ranked based at least in part on the user profile. At least one highly ranked media file is selected from among the ranked plurality of media files. At least one of the highly ranked media files is forwarded to the user over the packet-switched network.

In accordance with one aspect of the invention, the user profile includes a declared user profile specifying self-defined user preferences. The user profile may also include a behavior profile of the user based on online activity of the user. The behavior profile may include information identifying items displayed by the user during at least one online session.

In accordance with another aspect of the invention, the step of ranking the plurality of media files is performed in accordance with a keyword search of the behavior profile for preselected terms. Alternatively, ranking may be performed by forming an association between keywords found in the behavior profile and predefined categories of media content. As another alternative, the ranking may be performed in accordance with a social filtering technique.

In accordance with another aspect of the invention, the media files are audio files, which may include, for example, musical content and/or informational content.

In accordance with another aspect of the invention, either the declared user profile or the behavior profile is a default profile. For example, if the behavior profile is a default profile, the declared user profile may include prescribed conditions under which the behavior profile is to be adjusted in accordance with the declared user profile.

In accordance with another aspect of the invention, at least one advertisement is selected and forwarded to the user based at least in part on the user profile.

In accordance with another aspect of the invention, an online system provides selected media files, chosen from among a plurality of media files, to a user over a packet-switched network. The apparatus includes a database having a user profile that is associated with the user and which reflects user preferences in media content to be received over the packet-switched network. The apparatus also includes a processor for ranking the plurality of media files based at least in part on the user profile and for selecting at least one highly ranked media file from among the ranked plurality of media files. A server, which is in communication with the packet-switched network, receives a request from the user to receive media content. The server also forwards the highly ranked media file to the user over the packet-switched network.

DETAILED DESCRIPTION

At this point it is worth noting that any reference herein to "one embodiment" or "an embodiment" means that a particular feature, structure, or characteristic described in connection with the embodiment is included in at least one embodiment of the invention. The appearances of the phrase "in one embodiment" in various places herein are not necessarily all referring to the same embodiment.

The present invention provides a method and apparatus allowing individuals to receive a customized selection of audio programs over the Internet from a content provider. The audio programs are selected based on the interests, taste, and behavior of the individual. In this way each individual can experience a unique audio session most appropriate for him or her. The content provider provides this customized service by maintaining a profile of each user. The content provider develops the user profile from information received directly from the user as well as information indirectly obtained by monitoring and analyzing the online activity of the user. For example, if the content provider supplies musical selections, the user's taste in music may be determined by monitoring the music selected by the user over a period of time. Accordingly, over time, the programming provided to the user more accurately anticipates the user's preferences as the content provider continues to update its user profile database.

Figure 1:
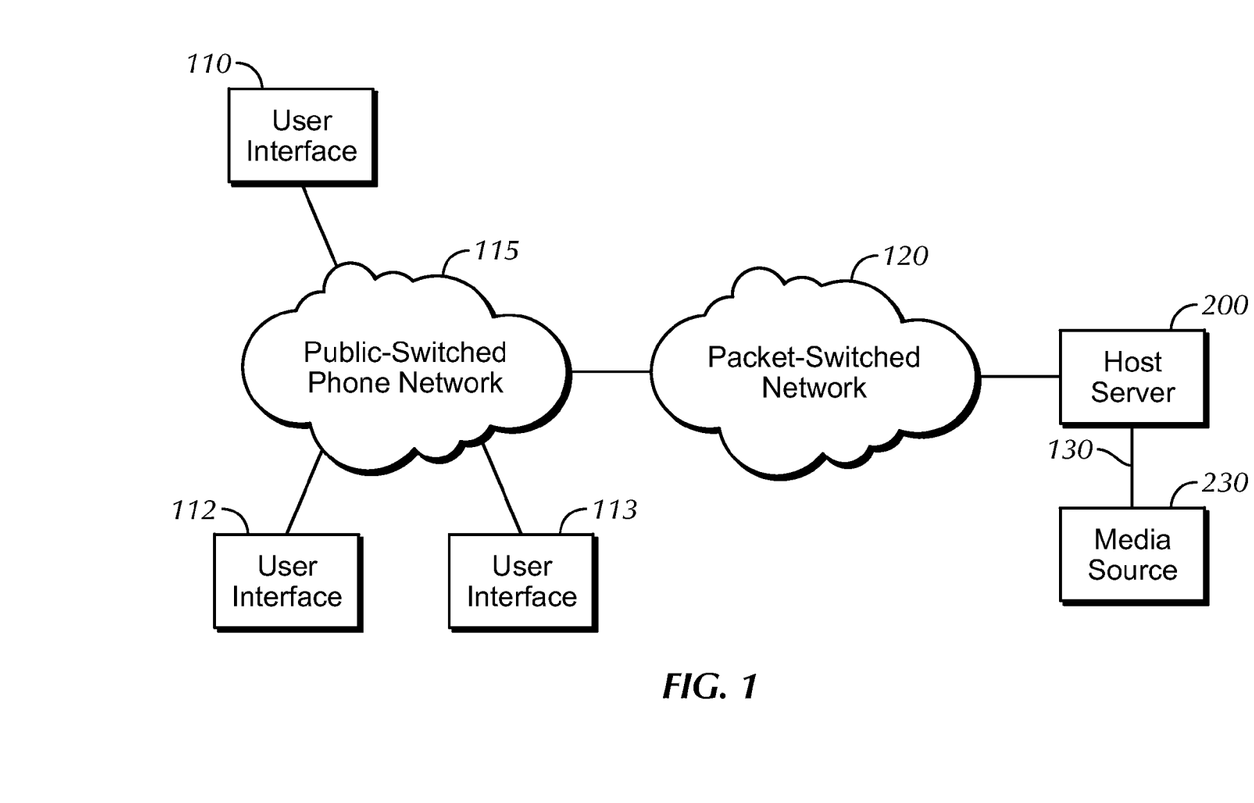
FIG. 1 shows the overall system architecture for practicing the present invention.

The system architecture of one embodiment of the apparatus and method of the present invention is illustrated with reference to FIGS. 1-4. As shown in FIG. 1, the apparatus of the present invention comprises user interface devices 110-113, host server 200 and media source 230. User interface devices 110-113 and host server 200 are connected via a packet-switched network 120, using, for example, a public switched phone network 115, such as those provided by a local or regional telephone operating company. Connection may also be provided by dedicated data lines, cellular, Personal Communication Systems ("PCS"), microwave, or satellite networks. Packet-switched network 120 is a collection of individual networks that are linked together by a set of standard protocols. One example of a packet-switched network is the Internet, which employs standard protocols such as TCP/IP and HTTP.

Media source 230 is a database of individual audio files such as musical selections, informational programming or other discrete audio selections. If media source 230 contains exclusively musical selections, for example, media source 230 effectively serves as an "online jukebox." Media source 230 will be typically maintained and operated by a content provider of audio content. It will be apparent to those of ordinary skill in the art that a wide variety of content providers may supply audio content to media source 230. For example, the content provider may include providers of specialized content or providers of general interest content such as radio and television broadcasters or more specialized media such as local police activity normally available on a citizen-band radio. However, radio stations will be used herein as an illustrative example because of the wide variety of content they make available and because they remain a relatively untapped source of data for transmission over the Internet. In addition, transmission of radio station broadcasts over the Internet can make available local content to a geographically diverse set of users.

Host server 200 serves as the primary interface for the user interface devices 110-113 through which the users access the data in media source 230. As shown in FIG. 1, media source 230 is connected to host server 200 by a high-speed communications link 130 such as a T1 or T3 datalink. Alternatively, the media source 230 and host server 200 may be coupled by packet-switched network 120. However, a direct datalink can provide faster uploads of compressed audio streams.

In some embodiments of the invention, media source 230 and host server 200 are maintained by different entities. For example, if a content provider such as a radio station maintains media source 230, the radio station may contract with another entity that maintains host server 200 so that the content provider can provide its listeners with customized content. In this case host server 200 may provide its services to multiple content providers, some of which may or may not be radio stations. In an alternative embodiment of the invention, the content provider maintains media source 230 and its own host server 200. In this case media source 230 and host server 200 may be collocated. In fact, media source 230 could even be a database located within host server 200.

In some embodiments of the invention host server 200 may be an on-line service provider or retailer. In these embodiments individuals contact host server 200 primarily in regard to the services or products being offered and not to receive audio or other media files that are associated with media source 230. Rather, the audio or other media content is provided to the individual to facilitate the transaction between the individual and the service provider or retailer by offering content which is customized to the taste and interests of that individual. Presumably, by providing content such as musical selections of the type most preferred by the individual, he or she will be most likely to extend the length of their on-line session with the host server and be more inclined to purchase a product or service. As mentioned below, the host server 200 may select the content most appropriate for the individual by receiving data from a so-called "cookie" that has been previously stored in the individual's user interface device. The cookie maintains a record of the activity of the user during previous on-line sessions, which may or may not have involved host server 200. This click-stream data is used by the host server 200 to populate behavior profile database 270, discussed below, from which the customized media content is determined.

Host server 200 is a computer system that provides audio streams over the Internet in accordance with any audio compression protocol such as Real Audio, Liquid Audio, A2b, or the Moving Pictures Experts Group (MPEG). In some embodiments of the invention host server 200 may also provide over packet-switched network 120 user-viewable hypertext documents (commonly referred to a web document or web page), which are interlinked with one another. Currently, the primary protocol for allowing applications to locate and acquire web documents is HTTP, and the web pages are encoded using HTML. However, as used herein, the terms "web" and "web site" are intended to encompass markup languages and transport protocols, which may be used in place of, or in addition to, HTML and HTTP, such as XML, for example.

Figure 2:
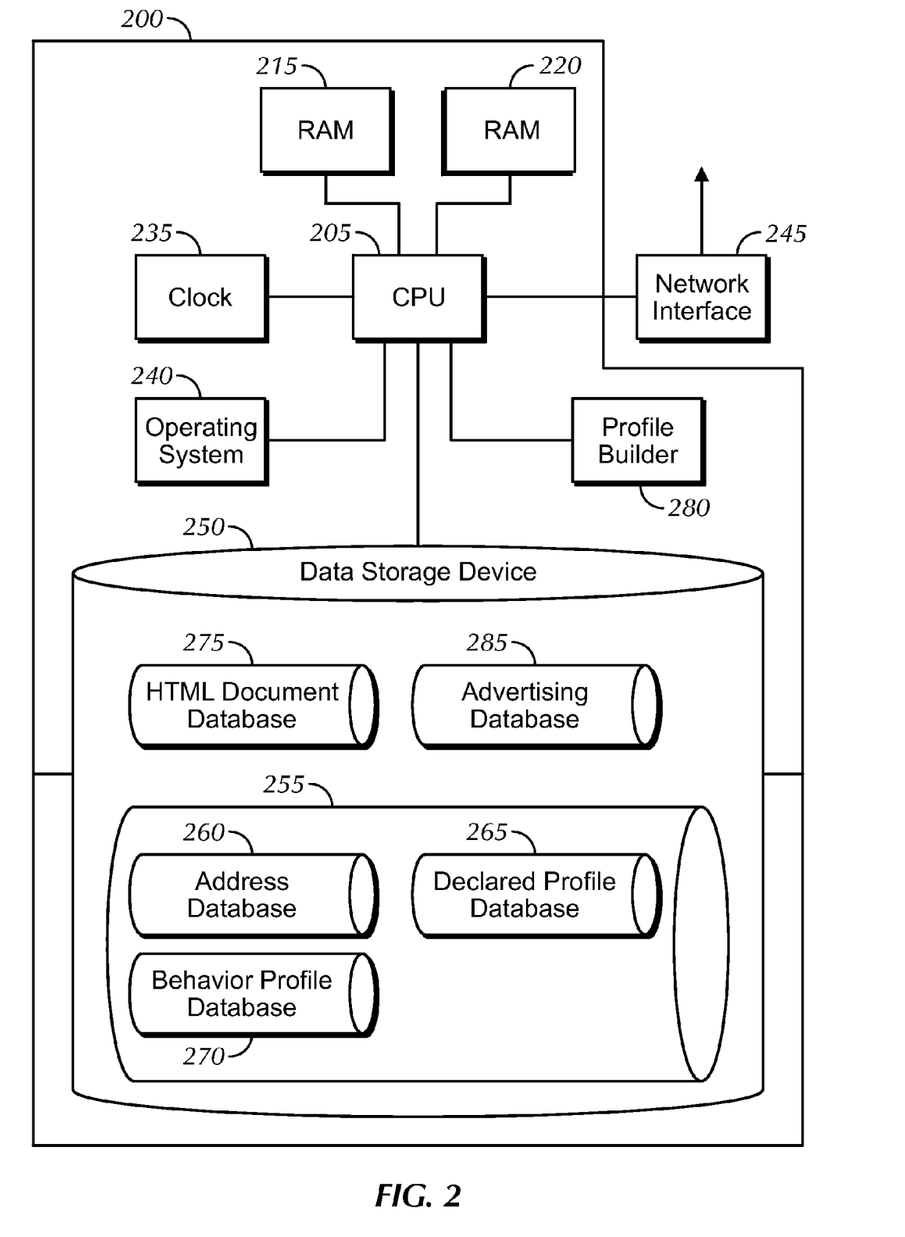
FIG. 2 shows a block diagram of the host server depicted in FIG. 1.

As shown in FIG. 2, host server 200 includes central processor (CPU) 205, RAM 215, ROM 220, clock 235, operating system 240, network interface 245, and data storage device 250. Host server 200 may be a conventional personal computer or computer workstation with sufficient memory and processing capability. In one embodiment of the invention host server 200 operates as a web server, both receiving and transmitting data inquiries generated by end users. Host server 200 must be capable of high volume transaction processing, performing a significant number of mathematical calculations in processing communications and database searches. Illustrative processors that may be employed include a Pentium microprocessor, commonly manufactured by Intel Inc., a PowerPC available from Motorola, or an UltraSPARC processor available from Sun Microsystems.

Network interface 245 is the gateway to communicate with users through their respective interface devices. Conventional internal or external modems may serve as network interface 245. Network interface 245 supports modems at a range of baud rates from 1200 upward, but may combine such inputs into a T1 or T3 line if more bandwidth is required. In one embodiment of the invention, network interface 245 is connected with the Internet and/or any of the commercial online services such as America Online, CompuServe, or Prodigy, allowing users access to the service from a wide range of online connections. Several commercial email servers include the above functionality. Users can exchange messages with enclosures such as files, graphics, video and audio.

While the above embodiment describes a single computer acting as the host server 200, those skilled in the art will realize that the functionality can be distributed over a plurality of computers. In another embodiment, host server 200 may be configured in a distributed architecture, wherein the databases and processors are housed in separate units or locations.

Data storage device 250 may include hard disk magnetic or optical storage units, as well as CD-ROM drives or flash memory. Data storage device 250 contains databases used in the processing of transactions in the present invention, including user profile database 255, HTML document database 275, and advertising database 285. In one embodiment of the invention database software, such as available from Oracle Corporation, is used to create and manage these databases.

User profile database 255 includes address database 260, declared profile database 265, and behavior profile database 270. Each of these databases will be discussed in turn. User profile database 255 may include a unique identification number to distinguish, for example, between the user's home, car and work interface devices so that each device has its own user profile.

Address database 260 maintains any addresses available for the user, and may include the user's name, email address, physical address, and voice mail address.

Declared profile database 265 includes self-defined areas of interest of the user. For example, if the content provider associated with the media source is a radio station, the user may specify a particular area of music such as jazz, popular or classical and/or particular musicians of interest. Alternatively, if the radio station transmits informational programming instead of music, the user may specify particular programs to be received, topics of interest, or even the language or languages in which the programming should be provided. In one particular embodiment of the invention, the user provides the information for declared profile database by selecting from pre-defined categories such as music and informational programming. The predefined categories can be provided to the user as an HTML document stored in HTML database 275 so that it appears to the user as a web page. Each pre-defined category may include sub-categories such as jazz, classical or popular music, or topics of interest such as public affairs, health, or educational issues. In this embodiment the users can rank their interest in each predefined category. Alternatively, the declared profile database 265 may be developed from a list of keywords provided by the user. In some instances the user may rank the keywords, or assign a relative importance weight or priority to each keyword. The user may also connect two or more keywords through the use of Boolean expressions.

Behavior profile database 270 maintains a history of the user's online activity, which in turn is interpreted as the user's habits or preferences. This database stores the identification screens displayed by the user during on-line sessions with the host server 200. It also stores the identification of items selected off the screens by the user (by a mouse click, for example) during the on-line sessions. After multiple sessions, a pattern of the user's viewing and selecting habits is obtained from the recorded activity. In turn, certain inferences about the user are made based on the recorded pattern, including the user's preferences in audio content. By determining the user preferences in this manner the system can predict which media files (stored in media source 230) may be of particular interest to the user.

In some embodiments of the invention behavior profile database 270 maintains a history of the user's on-line activity not only with the host server 200, but also with other on-line sites the user has previously been in communication with. This on-line activity can be recorded by a cookie that has been previously stored in the user's interface device. Upon establishing communication with the host server 200, the cookie downloads the data representing the recorded-on line activity of the user to the host server 200 so that it can be stored in behavior profile database 270. Profile builder 280 is a series of routines that ranks the media files in accordance with the user preferences determined from the information stored in the declared profile database 265 and the behavior profile database 270. Host server 200 may then provide the user with those media files having the highest ranking. While in FIG. 2 profile builder 280 is depicted as a discrete hardware component within host server 200, one of ordinary skill will recognize that profile builder alternatively may be embodied in software that resides in ROM 220 and which is executed in CPU 205.

The profile builder 280 may employ any of a number of techniques to rank the media files based on the data in the behavior profile database 270. For example, the profile builder may perform a keyword analysis of the items selected by user, which, as previously mentioned, are stored in the behavior profile database 270. The profile builder 280 may search the behavior profile database for predefined keywords pertinent to the media files of a particular content provider. For instance, if the media files are musical selections, the predefined keywords may include different musical categories and artists. Profile builder 280 may simply rank the media files based on the number of occurrences of the predefined keywords found in the behavior profile database 270. Returning to the example of musical programming, if a keyword search of the user's history indicates that he has previously listened to a number of selections by Miles Davis, for example, any media files of this artist will be given a high ranking. The particular ranking may depend on the number of times the user chooses a Miles Davis selection, and/or possibly the percentage of the user's total online time spent listening to Miles Davis selections. Alternatively, or in addition thereto, the profile builder 280 may rank the media files in a more complex manner. For example, the profile builder 280 may form an association between the keywords found in the behavior profile database 270 and a set of predefined categories. In this way the profile builder 280 can generalize the user's interests from specific examples. For instance, returning to the example of Miles Davis, the profile builder 280 may conclude that the user has an affinity for "cool jazz," thus giving a relatively high ranking to musical selections categorized as "cool jazz." As another example, if the user has listened to a number of programs concerning a particular issue such as say, federal land use, then the profile builder may give a relatively high ranking to media files relating to environmental issues.

Another ranking technique that may be employed by the profile builder 280 involves so-called "social filtering," such as described in U.S. Pat. No. 6,014,654, for example. In this technique, the data in the user's behavior profile database 270 is compared to corresponding data obtained from previous users. The profile builder 280 identifies previous users who have interests or taste similar to the current user. Once identified, the highest-ranking media files of such previous users may be provided in whole or part to the current user.

Once the profile builder 280 has analyzed the data in the behavior profile database, it will adjust its rankings based on the data in the declared profile database 265. This adjustment may be performed in a number of different ways, and will depend in part on the degree to which the user desires the rankings to be adjusted. For example, one of the pre-defined categories in the declared profile database 265 may specify under what conditions, if any, the behavior profile database 270 should be modified by the information in the declared profile database 265. That is, under these circumstances the rankings derived from the behavior profile database 270 are treated as default rankings unless something in the declared profile database 265 specifically overrides it. Returning again to the musical example, the user may specify, for instance, that rankings derived from the behavior profile database should not be altered in any way except for the ranking of music classified as classical avant-garde, in which case the behavior profile database 270 should be ignored and the rankings specified in the declared profile database 265 should be strictly followed. While in this example the declared profile database 265 specifies that rankings derived from the behavior profile database 270 should be treated as default rankings, one of ordinary skill in the art will recognize that the user also may specify the converse situation. That is, the declared profile database 265 may specify that the information therein should be used to determine a default ranking, which should only be modified by the information in the behavior profile database 270 under specific circumstances prescribed in the declared profile database.

Returning to FIG. 2, in some embodiments of the invention the host server 200 may include an advertising database 285 in its data storage device 250. Advertising database 285 stores advertisements of the content provider's sponsors. Advertisements may be provided to the user between different media files supplied by the media source 230. The advertisements that are provided to the user may be advantageously selected in accordance with the information contained in the user profile database 255. In this way advertisements may be individually selected for a given user based on factors such as the gender, age, location and interests of the user.

Figure 3:
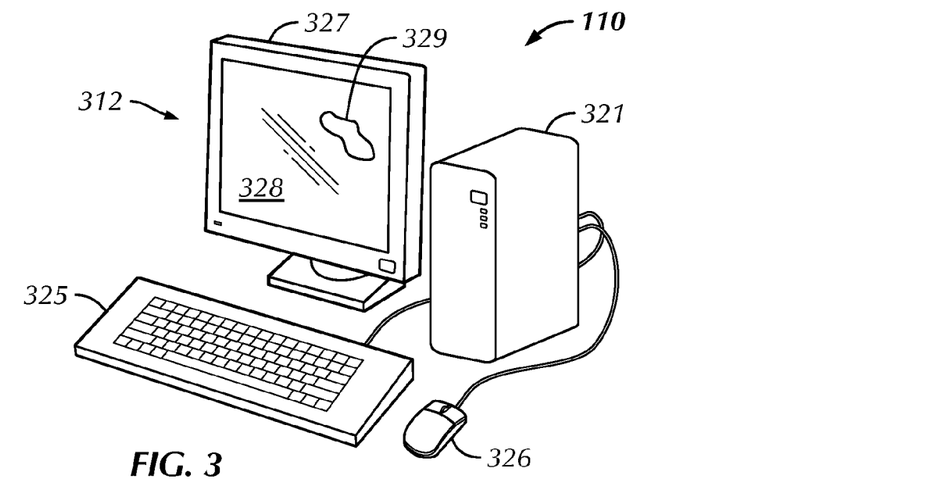
FIG. 3 shows an illustrative user interface device that may be employed in connection with the present invention.

FIG. 3 shows a block diagram of an illustrative user interface device 300 that may be employed in connection with the present invention. While the device 300 is illustrated as a general purpose computer, those or ordinary skill in the art will recognize that the user interface device may be any device that can communicate with, and download information from, an open computer network such as the Internet. For example, the user interface device may be a web-enabled television, telephone or other online appliance. As shown, the device 300 includes a system unit 321, a keyboard 325, a mouse 326 and a display unit 327. The screen 328 of the display unit 327 is used to present a graphical user interface (GUI). The graphical user interface supported by the operating system of the device 300 allows the user to use a point and shoot method of input, i.e., by moving the mouse pointer 329 to an icon representing a data object at a particular location on the screen 328 and pressing on the mouse buttons to perform a user command or selection. This type of arrangement also allows the user to directly manipulate an icon from one position to another on the screen, all in a known manner.

Figure 4:
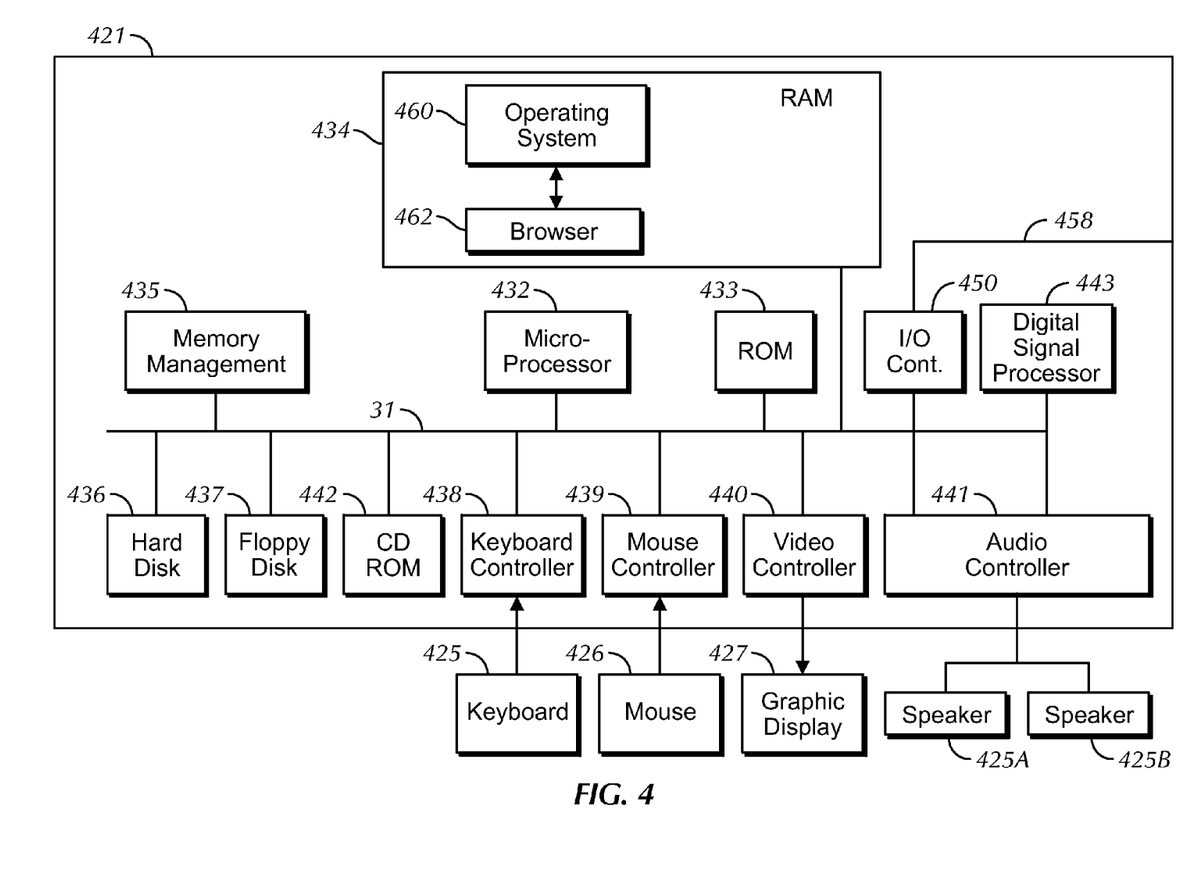
FIG. 4 is an architectural block diagram of the user interface device illustrated in FIG. 3.

Turning to FIG. 4, the system unit 321 includes a system bus or plurality of system buses 431 to which various components are coupled and by which communication between the various components is accomplished. The microprocessor 432 is connected to the system bus 431 and is supported by read only memory (ROM) 433 and random access memory (RAM) 434 also connected to system bus 431. The ROM 433 contains among other code the Basic Input-Output system (BIOS), which controls basic hardware operations such as the interaction of the disk drives and the keyboard. The RAM 434 is the main memory into which the operating system and application programs are loaded. The memory management chip 435 is connected to the system bus 431 and controls direct memory access operations including, passing data between the RAM 434 and hard disk drive 436 and floppy disk drive 437. The CD ROM 442, also coupled to the system bus 431, is used to store a large amount of data, e.g., a multimedia program or large database. Also connected to this system bus 431 are various I/O controllers: the keyboard controller 438, the mouse controller 439, the video controller 440, and the audio controller 441. The keyboard controller 438 provides the hardware interface for the keyboard 25, the controller 439 provides the hardware interface for the mouse (or other point and click device) 426, the video controller 440 is the hardware interface for the display 427, and the audio controller 441 is the hardware interface for the multimedia speakers 425a and 425b. A network interface card (NIC) interfaces to the I/O controller 450 to enable communication via path 456 to other computers over the computer network.

The operating system 460 of the computer may be MS-DOS, WINDOWS 3.x, WINDOWS 95, WINDOWS NT, OS/2, AIX, or any other known and available operating system. RAM 434 also supports a number of Internet access tools including, for example, an HTTP-compliant web browser 462. Known browser software includes Netscape Navigator, Microsoft Internet Explorer, mosaic, and the like. RAM 434 may also support other Internet services including simple mail transfer protocol (SMTP) or e-mail, file transfer protocol (FTP), network news transfer protocol (NNTP) or "Usenet", and remote terminal access (Telnet).

Figure 5:
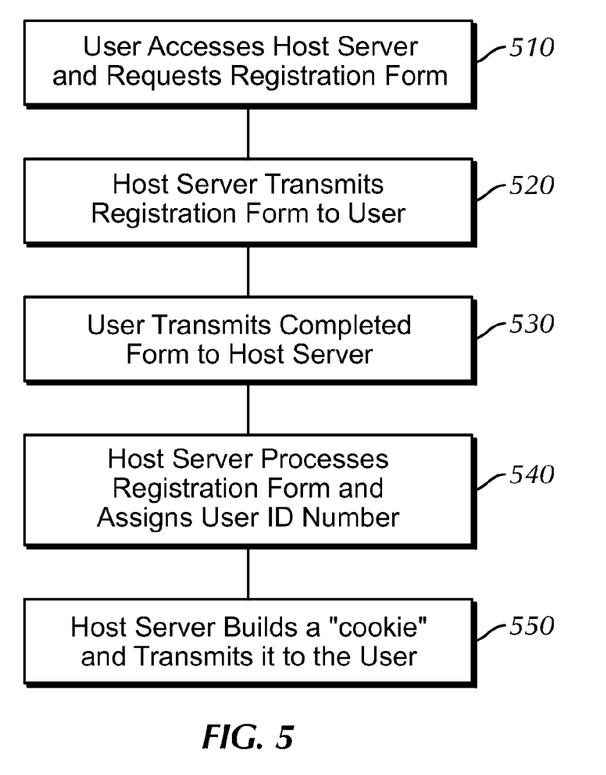
FIG. 5 is a flowchart depicting how a user registers with and receives audio content form the host server.

FIG. 5 shows an exemplary process by which a user registers with and receives audio content from the host server. In this example the user interface device is a personal computer. Assuming for purposes of illustration only that the user communicates with the host server over the World Wide Web, the registration process begins at step 510 by selecting the proper hyperlink containing online registration instructions. The central processing unit accesses the local database of HTML documents and, at step 520, returns an online registration application document to the user's web browser. The user can then fill out the detailed online registration form so that the address and declared profile databases can be populated. The user may simply type the information into windows supplied for that purpose. Alternatively, or in addition thereto, the user may be offered the option of selecting items from a pull-down menu.

Once the customer at step 530 completes the electronic registration form, it is sent from the user's interface device 110 to the host server for further processing. In response to the submission of the enrollment form, the central processing unit processes the information contained on the registration form at step 540. In one embodiment of the invention, an agent is used to scan the form for ambiguities or pre-specified terms and if such a term is found, to flag the application for further review by a staff member. If no such term is found and the application is complete, the central processing unit accepts the registration form.

Once the registration form has been completed the central processing unit generates a unique user ID to be assigned to the user, also at step 540. In addition, the central processing unit creates a database entry corresponding to the user and stores the user ID and the information provided by the user on the registration form as a unique entry in the address and declared profile databases 260 and 265. In response to the user-provided data (and assuming as in this example that the user interface device is a personal computer), the CPU builds a cookie at step 550. Included in the newly built cookie is the user's unique user ID, the time and date of the login, and possibly a user interface identification number to distinguish, for example, between the user's home, car and work interface devices. The host server transmits the cookie to the user's interface device for storage and future use. As previously mentioned, in some embodiments of the invention the cookie may maintain a record of the click-stream activity of the user during previous on-line sessions which do not involve host server 200 so that this activity can be used in the behavior profile database. Once the registration process is complete, if the user has previously registered, the host server begins the process of selecting media files for transmission to the user.

Figure 6:
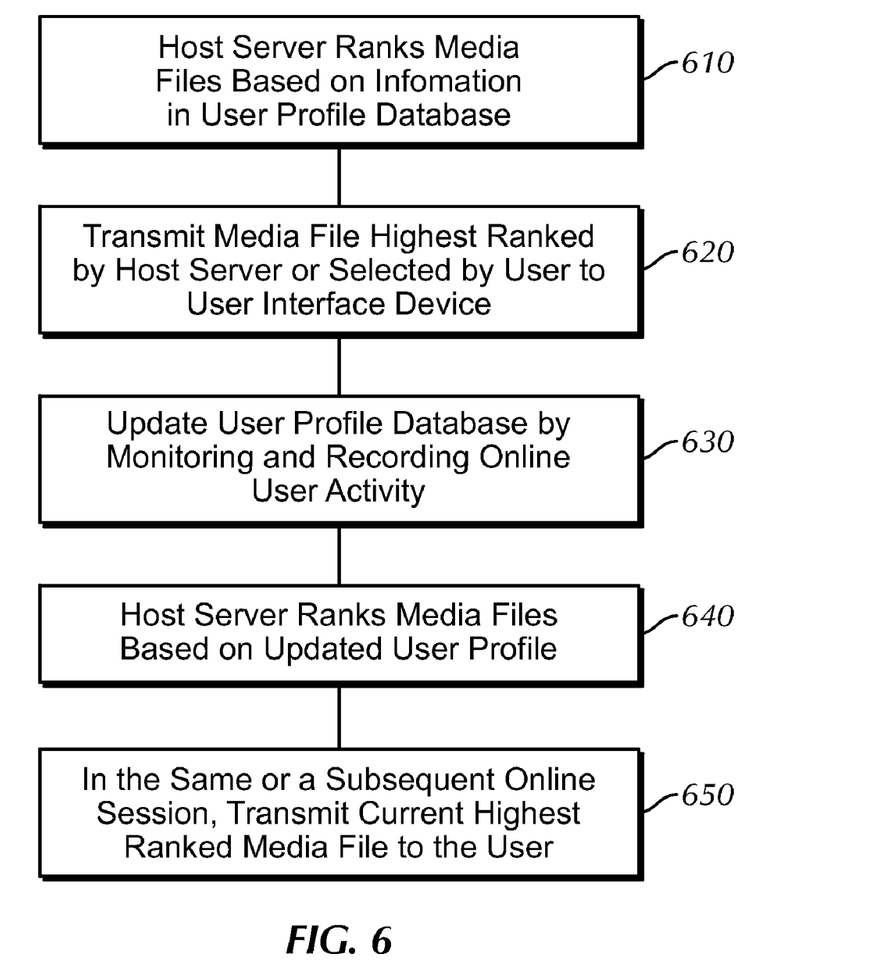
FIG. 6 is a flowchart depicting how the host server selects and transmits audio files to the user.

Referring to FIG. 6, based on the information provided by the user on the registration form and stored in the declared profile database, profile builder ranks the media files stored in the media source 230 at step 610. At step 620, the user has the option of choosing his or her own media file or allowing the host server to make the selection based on the user profile. In the latter case, upon retrieving the highest ranked media file, the host server transmits it to the user's interface device over the packet-switched network, also at step 620. In the former case the user may find a media file in which he or she is interested by selecting appropriate hyperlinks from the host server's web pages that direct the user to pull-down menus, which list the media files in different categories. In response to the receipt of the media file (whether self-selected or selected by the host server), the user may choose to listen to all, part, or none of the file.

As the user continues to make selections and respond to selections made by the host server, the user's activity is stored in the behavior profile database at step 630. The recorded activity includes the web pages visited by the user, the files that are selected, and the portion of each file that is listened to by the user. Each time a new media file is to be selected and provided to the user, the profile builder uses the most recent data in the user profile database to facilitate the selection (unless, of course, the user overrides the selection made by the host server) by updating its rankings at step 640. At the completion of a user session, the host server maintains the information pertaining to the user, which is located in its databases, so that it is available for subsequent sessions. In this way each subsequent session should automatically better conform to the user's interests and taste so that at step 650 the media file that is currently the highest ranked can be transmitted to the user.

The invention claimed is:

1. A method for providing selected media files from among a plurality of media files to a user over a packet-switched network, said method comprising the steps of:
   receiving over the packet-switched network a request from the user to receive media content;
   retrieving from a database a user profile associated with said user, said user profile reflecting user preferences in media content to be received over the packet-switched network;
   ranking the plurality or media files based at least in part on the user profile;
   selecting at least one highly ranked media file from among the ranked plurality of media files; and
   forwarding said at least one highly ranked media file to the user over the packet-switched network.

2. The method of claim 1 wherein said user profile includes a declared user profile specifying self-defined user preferences.

3. The method of claim 2 wherein said self-defined user preferences include predefined categories.

4. The method of claim 3 wherein said predefined categories include musical categories.

5. The method of claim 1 wherein said user profile includes a behavior profile of the user based on online activity of the user.

6. The method of claim 5 wherein said behavior profile includes information identifying items displayed by the user during at least one online session.

7. The method of claim 5 wherein said online activity on which the behavior profile is based includes an identification of web pages visited by the user and files selected by the user.

8. The method of claim 5 further comprising the step of receiving a record of previous online activity of the user.

9. The method of claim 1 wherein the step of ranking the plurality of media files is performed in accordance with a keyword search of the behavior profile for preselected terms.

10. The method of claim 1 wherein the step of ranking the plurality of media files includes the step of forming an association between keywords found in the behavior profile and predefined categories of media content.

11. The method of claim 1 wherein the step of ranking the plurality of media files is performed in accordance with a social filtering technique.

12. The method of claim 5 further comprising the step of updating the behavior profile based on online user activity subsequent to the forwarding step.

13. The method of claim 12 further comprising the steps of repeating the ranking, selecting, and forwarding steps based on a behavior profile updated during a previous online session.

14. The method of claim 1 wherein said media files are audio files.

15. The method of claim 9 wherein said audio files include musical content.

16. The method of claim 14 wherein said media files include informational content.

17. The method of claim 1 wherein said packet-switched network is the Internet.

18. The method of claim 1 wherein said user profile includes a declared user profile specifying self-defined user preferences and a behavior profile of the user based on online activity of the user.

19. The method of claim 18 either said declared user profile or said behavior profile is a default profile.

20. The method of claim 19 wherein said behavior profile is a default profile and said declared user profile includes prescribed conditions under which said behavior profile is to be adjusted in accordance with said declared user profile.

21. The method of claim 1 further comprising the step of selecting and forwarding to the user at least one advertisement based at least in part on the user profile.

22. The method of claim 1 further comprising the step of receiving a record of previous online activity of the user.

23. The method of claim 22 wherein said record is received from a cookie stored in an interface device of the user.

24. An online system for providing selected media files from among a plurality of media files to a user over a packet-switched network, said apparatus comprising:
- a database that includes a user profile associated with said user and reflecting user preferences in media content to be received over the packet-switched network;
- a processor for ranking the plurality of media files based at least in part on the user profile and selecting at least one highly ranked media file from among the ranked plurality of media files; and
- a server in communication with the packet-switched network for receiving a request from the user to receive media content and for forwarding said at least one highly ranked media file to the user over the packet-switched network.

25. The online system of claim 24 wherein said user profile includes a declared user profile specifying self-defined user preferences.

26. The online system of claim 25 wherein said self-defined user preferences include predefined categories.

27. The online system of claim 26 wherein said predefined categories include musical categories.

28. The online system of claim 24 wherein said user profile includes a behavior profile of the user based on online activity of the user.

29. The online system of claim 28 wherein said behavior profile includes information identifying items displayed by the user during at least one online session.

30. The online system of claim 28 wherein said behavior profile is updated based on online user activity subsequent to forwarding said at least one highly ranked media file to the user.

31. The online system of claim 30 wherein said server is a web server.

32. The online system of claim 28 wherein said online activity on which the behavior profile is based includes an identification of web pages visited by the user and files selected by the user.

33. The online system of claim 24 wherein said processor ranks the plurality of media files in accordance with a keyword search of the behavior profile for preselected terms.

34. The online system of claim 24 wherein said processor ranks the plurality of media files by forming an association between keywords found in the behavior profile and predefined categories of media content.

35. The online system of claim 24 wherein said processor ranks the plurality of media files in accordance with a social filtering technique.

36. The online system of claim 24 wherein said media files are audio files.

37. The online system of claim 36 wherein said audio files include musical content.

38. The online system of claim 36 wherein said media files include informational content.

39. The online system of claim 24 wherein said packet-switched network is the Internet.

40. The online system of claim 24 wherein said user profile includes a declared user profile specifying self-defined user preferences and a behavior profile of the user based on online activity of the user.

41. The online system of claim 40 either said declared user profile or said behavior profile is a default profile.

42. The online system of claim 41 wherein said behavior profile is a default profile and said declared user profile includes prescribed conditions under which said behavior profile is to be adjusted in accordance with said declared user profile.

43. The online system of claim 24 further comprising an advertisement database storing a plurality of advertisements, said processor selects and forwards to the user at least one advertisement based at least in part on the user profile.

44. The online system of claim 24 further comprising a media source database for storing said media files.

45. The online system of claim 44 wherein said media source database is located within said server.

46. The online system of claim 44 further comprising a data communications link coupling said media source database to said server.

47. A method for providing selected media files from among a plurality of media files to a user establishing communication with a host server over a packet-switched network, said method comprising the steps of:
- receiving over the packet-switched network a request from the user to establish communication with the host server;
- retrieving from a database a user profile associated with said user, said user profile reflecting user preferences in media content to be received over the packet-switched network;
- ranking the plurality of media files based at least in part on the user profile;
- selecting at least one highly ranked media file from among the ranked plurality of media files; and
- forwarding said at least one highly ranked media file to the user over the packet-switched network.

48. The method of claim 47 wherein said user profile includes a declared user profile specifying self-defined user preferences.

49. The method of claim 48 wherein said self-defined user preferences include predefined categories.

50. The method of claim 49 wherein said predefined categories include musical categories.

51. The method of claim 47 wherein said user profile includes a behavior profile of the user based on online activity of the user.

52. The method of claim 51 wherein said behavior profile includes information identifying items displayed by the user during at least one online session.

53. The method of claim 51 further comprising the step of updating the behavior profile based on online user activity subsequent to the forwarding step.

54. The method of claim 51 further comprising the step of receiving a record of previous online activity of the user.

55. The method of claim 47 wherein the step of ranking the plurality of media files is performed in accordance with a keyword search of the behavior profile for preselected terms.

56. The method of claim 47 wherein the step of ranking the plurality of media files includes the step of forming an association between keywords found in the behavior profile and predefined categories of media content.

57. The method of claim 47 wherein the step of ranking the plurality of media files is performed in accordance with a social filtering technique.

58. The method of claim 47 wherein said media files are audio files.

59. The method of claim 58 wherein said audio files include musical content.

60. The method of claim 58 wherein said media files include informational content.

61. The method of claim 47 wherein said packet-switched network is the Internet.

62. The method of claim 47 wherein said user profile includes a declared user profile specifying self-defined user preferences and a behavior profile of the user based on online activity of the user.

63. The method of claim 47 further comprising the step of receiving a record of previous online activity of the user.

64. The method of claim 63 wherein said record is received from a cookie stored in an interface device of the user.

65. The method of claim 47 further comprising the step of receiving a purchase inquiry from the user.

66. The method of claim 65 wherein said purchase inquiry is for a product or service not associated with the media content.

* * * * *

UNITED STATES PATENT AND TRADEMARK OFFICE
CERTIFICATE OF CORRECTION

| | | |
|---|---|---|
| PATENT NO. | : 7,739,335 B2 | Page 1 of 1 |
| APPLICATION NO. | : 09/795685 | |
| DATED | : June 15, 2010 | |
| INVENTOR(S) | : Siegel et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2832 days.

Signed and Sealed this

Seventeenth Day of May, 2011

David J. Kappos
*Director of the United States Patent and Trademark Office*